US012809610B2

(12) United States Patent
Seo et al.

(10) Patent No.: US 12,809,610 B2
(45) Date of Patent: Nov. 24, 2026

(54) MANAGING UPDATES ACROSS PARTITIONS IN A DISTRIBUTED CLOUD ALLOCATION SYSTEM

(71) Applicant: Microsoft Technology Licensing, LLC, Redmond, WA (US)

(72) Inventors: Kyung Hoon Seo, Kenmore, WA (US); Abhisek Pan, Bellevue, WA (US); Robert Warren Gruen, Seattle, WA (US); Yaswanth Malleedi, Redmond, WA (US); Ishai Menache, Redmond, WA (US); David Allen Dion, Bothell, WA (US); Thomas Moscibroda, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 18/334,089

(22) Filed: Jun. 13, 2023

(65) Prior Publication Data

US 2024/0419428 A1 Dec. 19, 2024

(51) Int. Cl.
*G06F 8/65* (2018.01)

(52) U.S. Cl.
CPC .................................... *G06F 8/65* (2013.01)

(58) Field of Classification Search
CPC ........................................................ G06F 8/65
USPC ........................................................ 717/172
See application file for complete search history.

(56) References Cited

U.S. PATENT DOCUMENTS

| | | | | |
|---|---|---|---|---|
| 8,832,847 | B2 * | 9/2014 | Anand | G06F 21/6218 726/26 |
| 10,440,145 | B1 * | 10/2019 | Torun | H04L 43/10 |
| 2014/0237465 | A1 * | 8/2014 | Lin | G06F 8/656 717/173 |
| 2017/0147227 | A1 * | 5/2017 | Stabrawa | G06F 3/065 |
| 2017/0206110 | A1 * | 7/2017 | Huang | G06F 9/50 |
| 2018/0081676 | A1 * | 3/2018 | Lindholm | G06F 8/656 |
| 2020/0026580 | A1 | 1/2020 | Bahramshahry et al. | |
| 2021/0191778 | A1 * | 6/2021 | Harwani | G06F 9/544 |
| 2021/0218825 | A1 * | 7/2021 | Sharma | H04L 67/52 |

(Continued)

OTHER PUBLICATIONS

International Search Report and Written Opinion received for PCT Application No. PCT/US2024/032332, Sep. 10, 2024, 15 pages.

(Continued)

*Primary Examiner* — Bradford F Wheaton
(74) *Attorney, Agent, or Firm* — Ray Quinney & Nebeker P.C.; James Bullough

(57) ABSTRACT

Updates are managed across partitions in a distributed cloud allocation system. Updates are managed in a variety of dimensions, e.g., by partition, time, or upgrade domain, to maintain a sufficient number of allocator instances to maintain service. An update service may receive, organize, schedule, and deliver updates to VM allocator instances to limit service disruptions. Updates may be aggregated based on partition scope. Updates to one or more partitions may be batched in a single update. Delivery and timing of updates may be configurable on a per partition basis. Allocator instances may receive batched updates at the same or different times. An update service may dynamically adapt to prevailing service conditions if an essential update is in progress and/or request demand is above a threshold.

20 Claims, 5 Drawing Sheets

500

(56) References Cited

U.S. PATENT DOCUMENTS

| | | | | |
|---|---|---|---|---|
| 2021/0279103 | A1* | 9/2021 | Herath | G06F 9/5005 |
| 2022/0237013 | A1* | 7/2022 | Attavar | G06F 8/65 |

OTHER PUBLICATIONS

International Preliminary Report on Patentability (Chapter I) received for PCT Application No. PCT/US2024/032332, mailed on Dec. 26, 2025, 10 pages.

* cited by examiner

MANAGING UPDATES ACROSS PARTITIONS IN A DISTRIBUTED CLOUD ALLOCATION SYSTEM

BACKGROUND

Cloud computing refers to the access and/or delivery of computing services and resources, including servers, storage, databases, networking, software, analytics, and intelligence, over the Internet ("the cloud"). A cloud computing platform may make such services and resources available to user entities, also referred to as "tenants" or "customers," for fees. Cloud computing customers request bulk compute resources to process workloads. Cloud computing systems utilize compute resources to execute code, run applications, and/or run workloads. A cloud service provider may utilize a management service (e.g., Azure® Resource Manager™ in Microsoft® Azure® or CloudTrail® in Amazon Web Services®) to monitor and control the creation and/or deployment (e.g., allocation) of compute resources in a cloud computing platform.

A management/allocation service operates on the cloud control plane to process requests to select suitable compute resources in the inventory that satisfy requests. A service for an availability zone hosting several hundred thousand servers may handle millions of requests per day.

Computing inventory in an availability zone may comprise a variety of partitions, which may be segmented from smallest to largest such as by server, rack, cluster, and data center. The partitions may be organized in a hierarchical manner. For example, a group of machines make up a rack, a group of racks make up a cluster, a group of clusters makes up a data center, and so on. Changes in the computing inventory affect the allocation of resources to customers by the management service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable management of updates across partitions in a distributed cloud allocation system. The implementation of updates may be managed to maintain adequate service to allocate computing inventory to meet requests for computing resource creation, including virtual machine (VM) creation. An update service may receive, plan or organize, schedule, and deliver one or more types of updates to VM allocator instances to control inventory disruptions and request fulfillment due to cache invalidations for updates. In particular, an allocator is configured to assign resource requests, including updates, to resource providers. Updates may be aggregated based on partition scope. Updates to one or more partitions may be batched in a single update. Delivery and timing of updates may be configurable on a per partition basis. Allocator instances may receive batched updates at the same or different times. An update service may dynamically adapt to prevailing service conditions, such as pausing update plans if an essential impactful update is in progress and/or request demand is above a threshold. Updates may be staggered in a variety of dimensions, including partition, time, or upgrade domain, to maintain a sufficient number of allocator instances to provide service.

In an aspect, an update service collector may be configured to receive from one or more update sources one or more types of computing inventory updates associated with computing devices in a computing inventory. Updates to allocator cache may reflect events that already occurred, such that allocator cache should be updated to reflect prevailing conditions after the occurrence of the events. An update service organizer may be configured to organize the updates in an update plan. An update service scheduler may be configured to schedule delivery of the updates according to the update plan. An update service producer may be configured to deliver the updates according to the schedule to a virtual machine (VM) allocator configured to allocate the computing devices for VMs based on VM requests and a state of the computing inventory, which may be maintained in cache. An update service retractor may be configured to roll back the updates delivered to the VM allocator.

An update service organizer may be configured to edit the update plan based on additional updates received by an update service collector. An update service organizer may be configured to aggregate updates as a batch of updates in the update plan based on the computing devices affected by the updates. An update service organizer may be configured to stagger updates in the update plan among partitions of the computing devices, such as based on a scope or magnitude of impact on the computing devices. An update service organizer may be configured to stagger updates in the update plan among a plurality of logical instances of the VM allocator so that at least one of the logical instances of the VM allocator remains available to fulfill VM requests. An update service organizer may be configured to stagger updates in the update plan among a plurality of allocation domains. An update service organizer may be configured to pause updates in the update plan based on an availability of the computing devices for allocation by the VM allocator to fulfill VM requests. An update service collector may receive updates comprising a first type of update (e.g., non-essential impactful updates), but not a second type of update (e.g., essential impactful updates) that are delivered to the VM allocator.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further explain the principles of the embodiments and to enable a person skilled in the pertinent art to make and use the embodiments.

Figure 5A:
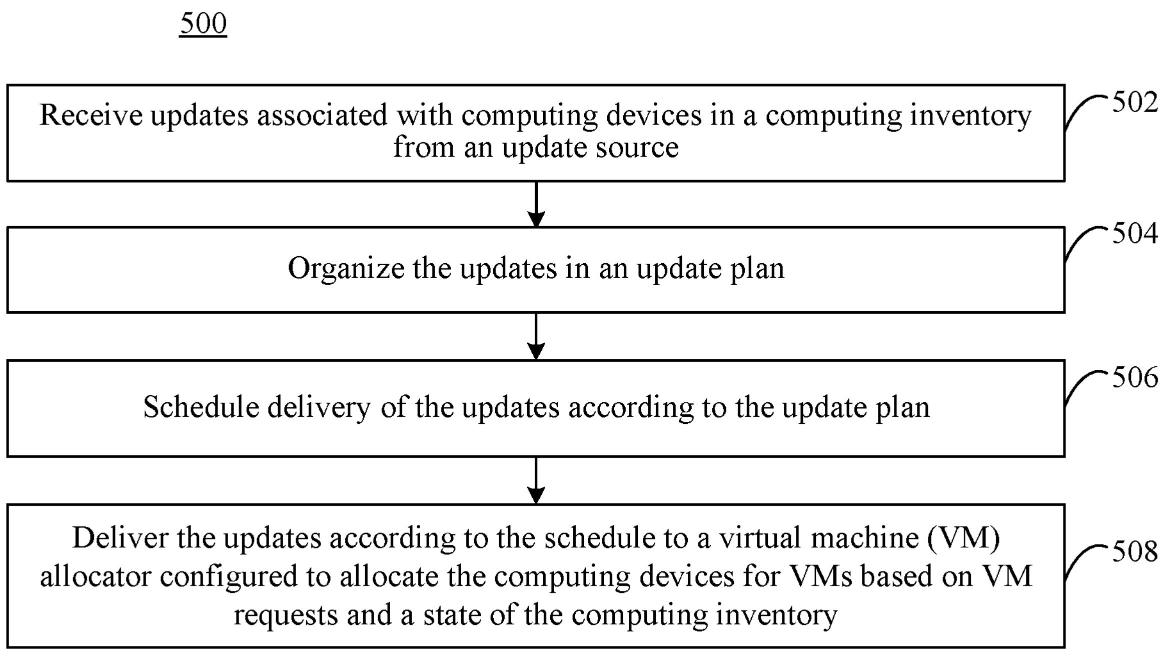
FIG. 5A shows a flowchart of a process for managing updates across partitions in a distributed cloud allocation system, in accordance with an embodiment.
Figure 5B:
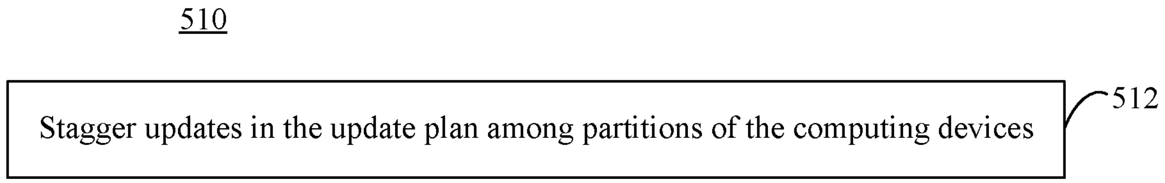
Figure 5C:
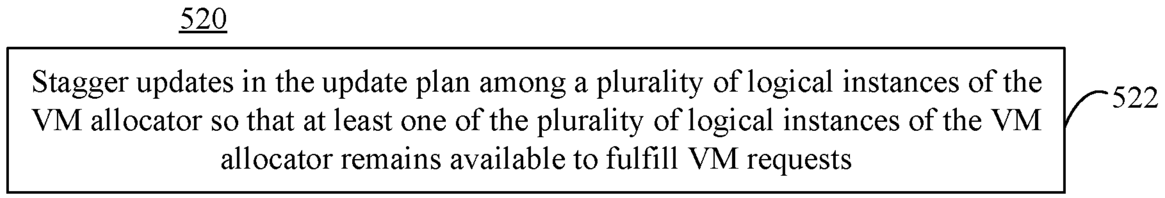
Figure 5D:
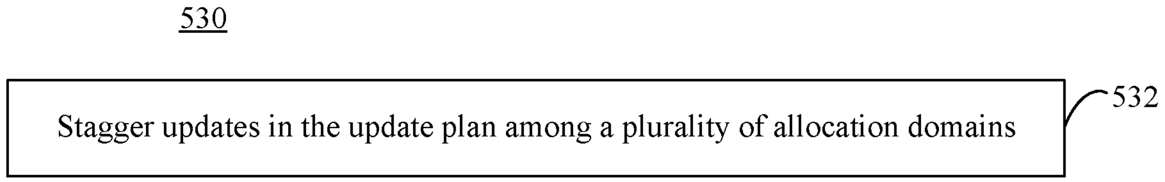

FIGS. 5B-D shows flowcharts of processes for staggering updates in a distributed cloud allocation system, in accordance with example embodiments.

Figure 6:
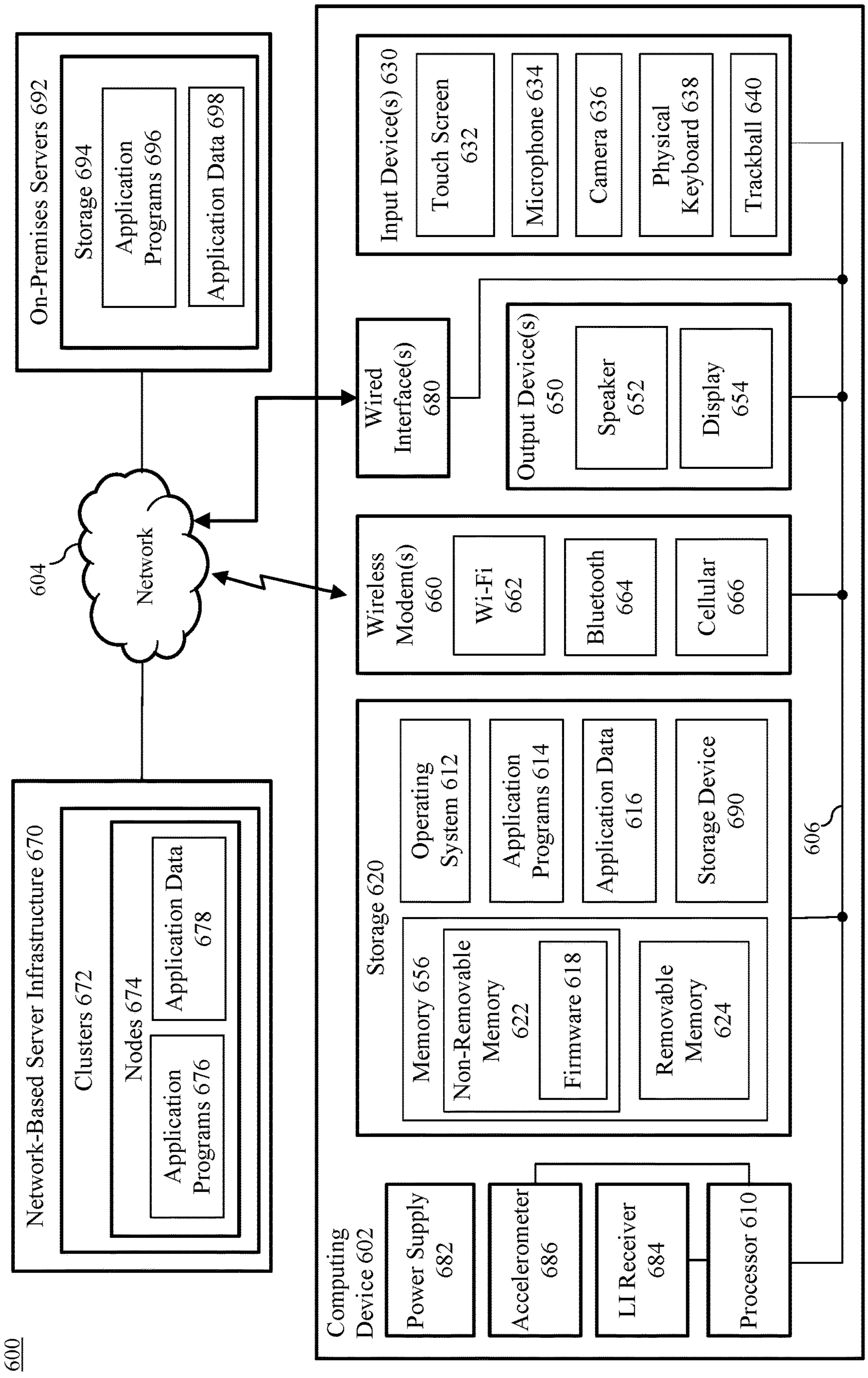

FIG. 6 shows a block diagram of an example computer system in which embodiments may be implemented.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing customers request bulk compute resources to process workloads. Cloud-based systems utilize compute resources to execute code, run applications, and/or run workloads. Examples of compute resources include, but are not limited to, virtual machines (VMs), virtual machine scale sets, clusters (e.g., Kubernetes clusters), machine learning (ML) workspaces (e.g., a group of compute intensive virtual machines for training machine learning models and/or performing other graphics processing intensive tasks), serverless functions, graphical processing units (GPUs), and/or other compute resources of cloud computing platforms. Those type of resources are used by entities (e.g., users, clients, customers) to run code, applications, and workload in cloud environments. Customers are billed based on the usage, scale, and compute power the customer consume. A cloud service provider may utilize a management service (e.g., Azure® Resource Manager™ in Microsoft® Azure® or CloudTrail® in Amazon Web Services®) to monitor and control the creation and/or deployment (e.g., allocation) of compute resources in a cloud computing platform.

A management/allocation service operates on the cloud control plane to process requests to select suitable servers in the inventory for VMs that satisfy requests while optimizing efficiency and quality of service (QoS) related goals (e.g., avoiding server fragmentation or VM performance disruptions due to noisy neighbor issues). The efficacy, scalability, and performance of a management/allocation service impacts the QoS provided by the cloud provider. A logical instance of the service may handle millions of requests per day for an availability zone hosting, for example, several hundred thousand servers.

Computing inventory in an availability zone may comprise a variety of partitions, e.g., from smallest to largest: server, rack, cluster, and data center (note that further partitions, including units that are smaller, such as CPUs, memory, and/or storage, or larger than those listed, may be present). The partitions may be organized in a hierarchical manner. For example, a group of machines make up a rack, a group of racks make up a cluster, a group of clusters makes up a data center, and so on.

Management/allocation service performance goals may be monitored by request handling latency and peak request handling throughput. The quality of decisions, such as VM placement decisions, may be measured by metrics, such as request acceptance success rate (e.g., number of failed requests when there are eligible servers in the inventory), server packing density, VM availability, and interruption rates (e.g., allocator avoidance of servers that are unhealthy or at risk of failures), etc. Decision quality may depend on the candidate servers evaluated, e.g., evaluating a larger number of candidates may lead to higher quality decisions. Performance may be improved (e.g., maximized) without compromising quality, for example, by maintaining caches with information about the inventory across partitions, such as a cache that provides the information of which servers within each partition support a certain VM type.

A management/allocation service may have multiple instances of the management/allocation service running concurrently to serve a multitude of requests. An (e.g., each) instance may maintain its own copy of computing inventory cache, e.g., to efficiently perform allocation.

A change in the inventory may result in the state of the cache being invalidated for an affected partition. The impact may be small if the partition is small (e.g., one to a few servers). However, as the partition size increases, the process of invalidating and rebuilding the cache states for each instance of the management/allocation service with its own cache may have a larger impact on the request handling ability of the management/allocation service instances (e.g., allocators). Any cache invalidating updates may be referred to as impactful updates.

A large update of a partition may result in the invalidation of all sub-partitions that belong to the partition. For example, a large update to a cluster of server racks may invalidate all the racks and machines (e.g., servers) within the cluster. Large updates may be expensive because they cause temporary downtime for the service to update the state of inventory.

There may be multiple sources that produce impactful updates. The allocators consume the updates and reevaluate (e.g., rebuild, reconstitute) their caches to reflect the updates. An impactful update of a partition may result in the invalidation of all sub-partitions that belong to the partition. For example, an impactful update to a cluster may invalidate all the racks and machines (e.g., servers) within a cluster.

Impactful updates may be expensive because they cause temporary downtime for allocators (e.g., service instances) to render the cache consistent with the latest state of inventory. There may be multiple types of impactful updates, e.g., essential and non-essential. An example of an essential impactful update may be a machine with faulty hardware. Another example, is a machine undergoing an operating system (OS) update, rendering the machine unavailable for up to 30 minutes. An update may be sent as an OS update begins or a hardware fault becomes known. Placing a VM in a machine with faulty hardware would be an erroneous decision and cause customer impact, which is why essential impactful updates should be addressed as quickly as possible. An example of a non-essential impactful update may be information about a rack's power consumption profile. It may not be an optimal decision to place a VM in a rack with a growing power consumption profile, but it may be permissible. Another example of a non-essential update may be updates about policy changes that are identified by offline machine learning (ML)/optimization systems, such as policy changes in best-fit packing algorithms in an allocator. It may be reasonable to delay these updates to avoid significant service disruptions.

Large updates delivered directly from sources to the service as they happen may significantly impact the service. Similarly, essential and non-essential impactful updates delivered directly from sources to allocators (e.g., service instances) as they happen may significantly impact QoS due to unpredictable, real-time cache reevaluations for affected partitions as a large number of sources send updates. Since large updates and impactful updates are unpredictable in timing and scope, it is possible that many to all partitions (e.g., the entire inventory) may be updated at the same time in many to all instances, which may result in all instances being unavailable to serve customer requests simultaneously, effectively causing an outage.

According to embodiments described herein, updates may be managed across partitions in a distributed cloud allocation system. Some updates (e.g., non-essential impactful updates) may be managed (e.g., staggered), e.g., rather than immediately processed, to maintain adequate service availability to allocate computing inventory to meet requests for virtual machine (VM) creation. An update service may receive, plan or organize, schedule, and deliver one or more types of updates to VM allocator instances to control (e.g., limit) inventory disruptions and request fulfillment due to cache invalidations for updates. Updates may be aggregated based on partition scope. Updates to one or more partitions may be batched in a single update. Delivery and timing of updates may be configurable (e.g., round-robin, random, first-in, first-out, etc.) on a per partition basis. For example, a time interval for updates to clusters may be larger than a time interval for updates to racks. Allocator instances may receive batched updates at the same or different times. An update service may dynamically adapt to prevailing service conditions. For example, an update service may pause update plans if an essential impactful update is in progress and/or request demand is above a threshold. Updates may be staggered in a variety of dimensions, e.g., by partition, time, or upgrade domain, to maintain a sufficient number of allocator instances to fulfill allocation demands. Non-impactful updates may alternatively be combined with impactful updates. Such a combination may be used to optimize/reduce the number of allocator instance restarts. The update service may be configured to determine which non-essential updates are safe to combine with an impactful update.

In examples, an update service collector (e.g., listener) may be configured to receive from one or more update sources and one or more types of computing inventory updates (e.g., state changes, such as updates to basic input output system (BIOS), software, operating system (OS), security, temperature) associated with computing devices in a computing inventory. An update service organizer (e.g., planner) may be configured to organize the updates in an update plan. An update service scheduler may be configured to schedule delivery of the updates according to the update plan. An update service producer may be configured to deliver the updates according to the schedule to a virtual machine (VM) allocator configured to allocate the computing devices for VMs based on VM requests and a state of the computing inventory, which may be maintained in cache. An update service retractor may be configured to roll back the updates delivered to the VM allocator.

An update service organizer may be configured to edit (e.g., dynamically adapt) the update plan based on additional updates received by an update service collector. An update service organizer may be configured to aggregate (e.g., group) updates as a batch of updates in the update plan based on the computing devices affected by the updates. An update service organizer may be configured to stagger updates in the update plan among partitions (e.g., groups or portions) of the computing devices, for example, based on a scope or magnitude of impact on the computing devices, such as a number of computing devices, racks, clusters, data centers, etc. An update service organizer may be configured to stagger updates in the update plan among a plurality of logical instances of the VM allocator so that at least one of the pluralities of logical instances of the VM allocator remains available to fulfill VM requests. An update service organizer may be configured to stagger updates in the update plan among a plurality of allocation domains. An update service organizer may be configured to pause (e.g., delay) updates in the update plan based on an availability of the computing devices for allocation by the VM allocator to fulfill VM requests. An update service collector may receive updates comprising a first type of update (e.g., non-essential impactful updates) and/or a second type of update (e.g., essential impactful updates) that are delivered (e.g., directly) to the VM allocator.

Managed updates that contain inventory invalidations in allocator instances may improve request handling latency, peak request handling throughput, request acceptance success rate, server packing density, VM availability, interruption rates, and QoS, etc.

Figure 1:
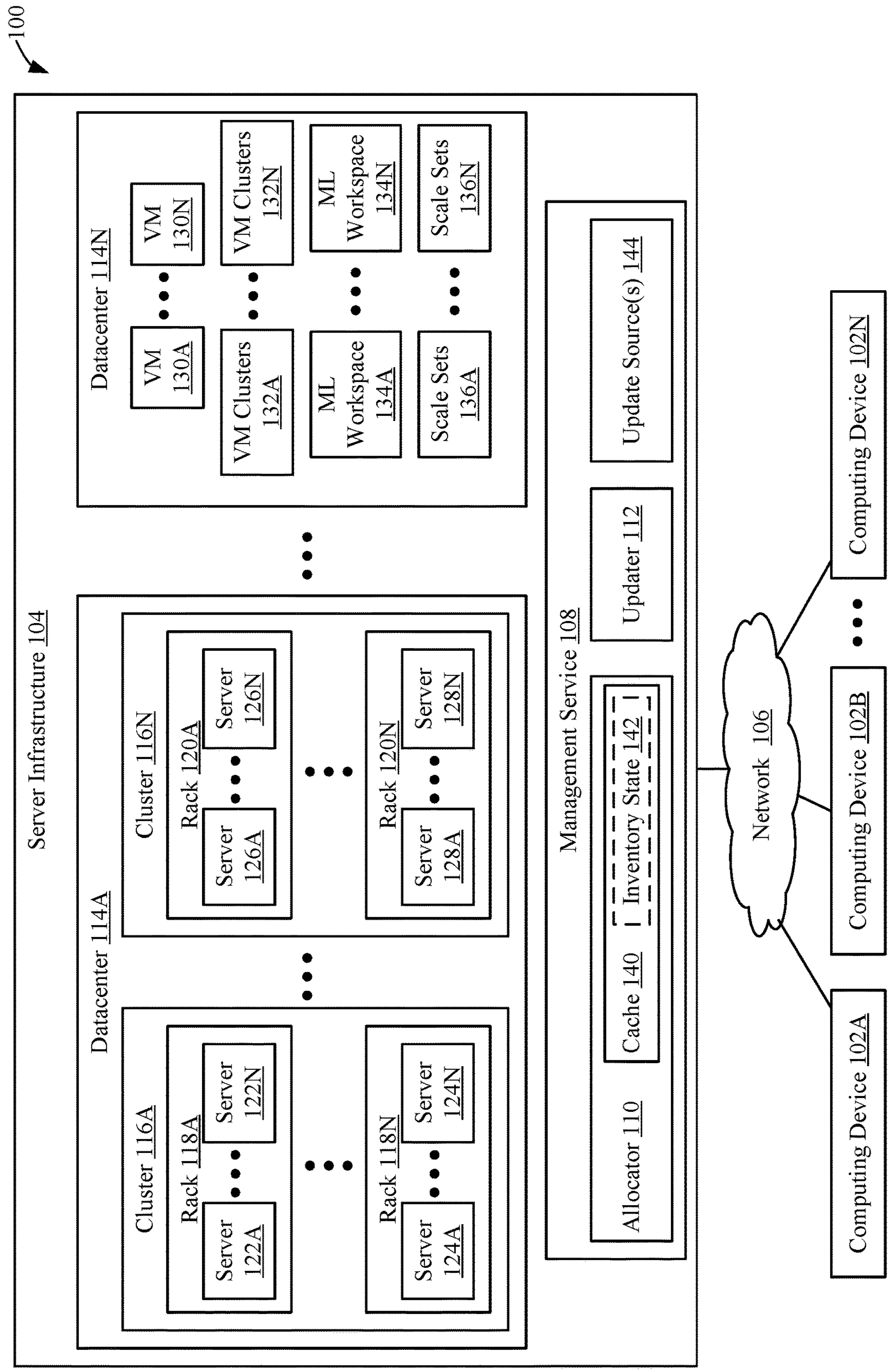
FIG. 1 illustrates a block diagram of an example network-based computing system configured to enable management of updates across partitions in a distributed cloud allocation system, in accordance with an embodiment.

To help illustrate the aforementioned embodiments, FIG. 1 will now be described. In particular, FIG. 1 illustrates a block diagram of an example network-based computing system 100 ("system 100" hereinafter) configured to enable management of updates across partitions in a distributed cloud allocation system, in accordance with an embodiment. As shown in FIG. 1, system 100 includes one or more computing devices 102A, 102B, and 102N (collectively referred to as "computing devices 102A-102N") and a server infrastructure 104. Each of computing devices 102A-102N and server infrastructure 104 are communicatively coupled to each other via network 106. Network 106 may comprise one or more networks such as local area networks (LANs), wide area networks (WANs), enterprise networks, the Internet, etc., and may include one or more of wired and/or wireless portions.

Server infrastructure 104 may be a network-accessible server set (e.g., a cloud-based environment or platform). As shown in FIG. 1, server infrastructure 104 may be partitioned into datacenters, clusters, racks and servers. Server infrastructure 104 includes a management service 108 and one or more datacenters 114A-114N. Each datacenter 114A-N may comprise one or more clusters 116A-116N. Each of clusters 116A-N may comprise one or more server racks. Each of one or more server racks may comprise one or more servers, and which may include one or more storage devices. For example, as shown in FIG. 1, cluster 116A includes server racks 118A-N and cluster 114N includes server racks 120A-120N. Server rack 118A includes servers 122A-N, server rack 118N includes servers 124A-N, server rack 120A includes servers 126A-N, and server rack 120N includes servers 128A-N. Each datacenter, cluster, rack and server are accessible via network 106 (e.g., in a "cloud-based" embodiment) to build, deploy, and manage applications and services. Any server may comprise one or more physical storage devices that are accessible via network 106, which may be configured to store data associated with the applications and services managed by servers 122A-N, servers 124A-N, servers 126A-N, and/or servers 128A-N associated with each datacenter 114A-N.

In an embodiment, datacenter clusters 116A-116N may be co-located (e.g., housed in one or more nearby buildings with associated components such as backup power supplies, redundant data communications, environmental controls, etc.), or may be arranged in other manners. In an embodiment, datacenters 114A-N may be a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Datacenter 114N shows how management service 108 may allocate datacenters 114A-N, clusters 116A-N in each datacenter, racks in each cluster, and/or servers in each rack for utilization as one or more compute nodes (e.g., nodes). A compute node or node may comprise one or more server computers, server systems, and/or computing devices. Each node may be configured to execute one or more software applications (e.g., "applications") and/or services and/or manage hardware resources (e.g., processors, memory, etc.), which may be utilized by users (e.g., customers) of the network-accessible server set. Node(s) may also be configured for specific uses. For example, as shown in datacenter 114N, a compute node may be allocated and configured to execute one or more virtual machines (VMs) 130A-130N, VM clusters 132A-132N, machine-learning (ML) workspaces 134A-134N, and/or scale sets 136A-136N.

As shown in FIG. 1, management service 108 includes an allocator 110 and an updater 112. Management service 108 may be internal and/or external to server infrastructure 104. For instance, management service 108 may be incorporated as a service executing on a computing device of server infrastructure 104. For instance, management service 108 (e.g., or a subservice thereof) may be configured to execute on any of nodes 116A-116N and/or 118A-118N. Alternatively, management service 108 (or a subservice thereof) may be incorporated as a service executing on a computing device external to server infrastructure 104. Furthermore, allocator 110 and/or updater 112 may be incorporated as the same service or subservice. As shown in FIG. 1, server infrastructure 104 may include a single management service 108; however, it is also contemplated herein that a server infrastructure may include multiple management services. For example, server infrastructure 104 may include a separate management service for each datacenter of datacenters 114A-114N, for each cluster in each datacenter (e.g., respective cluster management services), or any other type of partitioning.

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102A-102N store data and execute computer programs, applications, and/or services.

Users utilize computing devices 102A-102N to access applications, data, and/or services (e.g., management service 108 and/or subservices thereof, services executing on nodes 116A-116N and/or 118A-118N) offered by the network-accessible server set. For example, a user may be enabled to utilize the applications, data, and/or services offered by the network-accessible server set by signing-up with a cloud services subscription with a service provider of the network-accessible server set (e.g., a cloud service provider). Upon signing up, the user may be given access to a portal of server infrastructure 104, not shown in FIG. 1. A user may access the portal via computing devices 102A-102N (e.g., by a browser application executing thereon). For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) before being given access to the portal.

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) 116A-116N and 118A-118N to operate as a particular server (e.g., a database server, OLAP (Online Analytical Processing) server, etc.); etc. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, GPUs, etc. The portal may be configured in any manner, including being configured with any combination of text entry, for example, via a command line interface (CLI), one or more graphical user interface (GUI) controls, etc., to enable user interaction.

Users may use computing devices 102A-N to request allocation of VMs by management service 108. Management service 108 (e.g., instances of allocator 110) may allocate computing devices to fulfill requests based on available inventory. Management service 108 (e.g., allocator 110) may represent or may include a VM allocation service that receives requests from computing devices 102A-N to create and allocate virtual machines (e.g., VM 130A-130N, VM clusters 132A-N, ML workspaces 134A-N, scale sets 136A-N, etc. There may be multiple instances of management service 108 (e.g., allocator 110 and/or updater 112).

Allocator 110 may receive requests from one or more entities (e.g., via computing devices 102A-N), e.g., for virtual machine (VM) allocation. A (e.g., each) request may include one or more parameters indicating, for example, a number of VMs, VM type(s) (e.g., size, SKU, identifier), location (e.g., region, zone), security (e.g., public key), etc. An example of allocator 110 includes, but is not limited to, Azure® Resource Manager™ owned by Microsoft® Corporation, although this is only an example and is not intended to be limiting. Alternatively, allocator 110 may be configured to automatically determine to allocate VMs (rather than being requested to), such as periods of high traffic.

Allocator 110 may be implemented with multiple instances running concurrently to serve a large number of requests. Each instance of allocator 110 may be a logical instance that serves requests for an availability zone, which may host, for example, several hundred thousand servers. The inventory managed by each instance may or may not overlap. Inventory managed/allocatable by various instances may be partitioned, for example, based on servers, racks, clusters, and data centers in various regions and zones. Computing inventory in an availability zone may comprise a variety of partitions, e.g., from smallest to largest: server, rack, cluster, and data center. The partitions may be organized in a hierarchical manner. For example, a group of machines make up a rack, a group of racks make up a cluster, a group of clusters makes up a data center, and so on.

Allocation efficiency may be improved by maintaining caches with information about the inventory across partitions, such as a cache that provides the information of which servers within each partition support a certain VM type. Thus, each instance of allocator (e.g., allocator instance) 110 may maintain a state of computing devices in the inventory of server infrastructure 104 allocatable by the allocator instance 110. As shown in FIG. 1, an (e.g., each) instance may maintain its own copy of the state of computing inventory (e.g., inventory state) 142 in cache 140.

A change in the inventory (e.g., indicated by an update) may result in the inventory state 142 being invalidated for the affected partition (e.g., server(s), rack(s), cluster(s), datacenter(s)). Allocator 110 may process (e.g., "consume") each update, for example, by reevaluating (e.g., rebuilding, reconstituting) inventory state 142 in cache 140 to reflect each update. Each allocator instance 110 must process changes in inventory, for example, by invalidating and rebuilding the inventory state/cache state 142, which may impact the request handling ability of each allocator instance 110.

Larger inventory partition updates may be referred to as impactful updates. There may be multiple sources that produce impactful updates. Impactful updates may be expensive because they cause temporary downtime for allocators (e.g., service instances) to render the cache consistent with the latest state of inventory. An impactful update of a partition may result in the invalidation of all sub-partitions that belong to the partition. For example, an impactful update to cluster 116A may invalidate all the racks (e.g., racks 118A-N) and servers 122A-N . . . 124A-N within cluster 116A.

There may be multiple types of impactful updates, e.g., essential and non-essential. An example of an essential impactful update may be a machine with faulty hardware. Examples of non-essential impactful updates may be information about a rack's power consumption profile or policy changes that are identified by offline machine learning (ML)/optimization systems, such as policy changes in best-fit packing algorithms in an allocator.

Updater 112 may manage one or more types of updates across partitions in a distributed cloud allocation system. Updater 112 may receive one or more types of updates from update source(s) 144. Updater 112 may manage updates to control when allocator instances 110 process the updates, e.g., as opposed to unmanaged updates that allocator instances 110 may process as they are produced by update source(s) 144.

Updater 112 may support allocator instances 110 by maintaining an adequate number of allocator instances 110 to allocate computing inventory for requests by users for VMs. Updater 112 may manage updates (e.g., organize, buffer/delay, rearrange, group, ungroup, separate, stagger, and otherwise manipulate updates) to avoid significant service disruptions at various allocator instances 110.

Updater 112 may be configurable. Updater 112 may be configured to aggregate updates based on partition scope. Updater 112 may be configured to batch updates to one or more partitions in a single update. Updater 112 may be configured to provide batched updates to allocator instances 110 at the same or different times. Updater 112 may be configured to schedule delivery (e.g., timing) of updates based on one or more schemes, such as round-robin, random, first-in, first-out, etc., e.g., on a per partition basis. For example, updater 112 may be configured to apply a time interval for updates to clusters that is larger than a time interval for updates to racks. Updater 112 may dynamically adapt to prevailing service conditions. For example, updater 112 may pause update plans if an essential impactful update is in progress and/or if request demand is above a threshold. Updater 112 may be configured to stagger updates in a variety of dimensions, (e.g., by partition, time, or upgrade domain) for example, to maintain a sufficient number of allocator instances 110 to provide allocation services.

Managed updates may improve request handling latency, peak request handling throughput, request acceptance success rate, server packing density, VM availability, interruption rates, QoS, etc.

Figure 2:
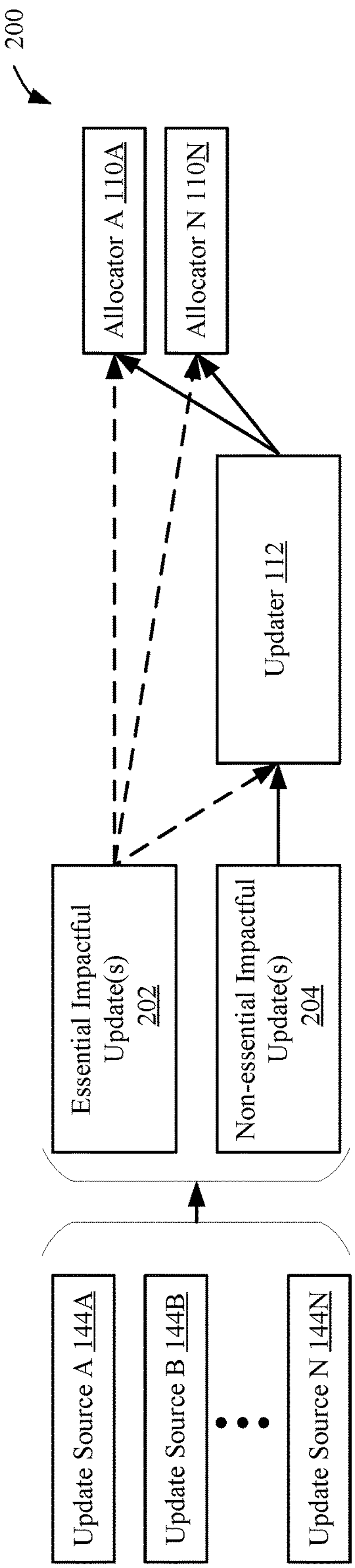
FIG. 2 illustrates an example of managed versus unmanaged types of updates, in accordance with an embodiment.

FIG. 2 illustrates an example of managed versus unmanaged types of updates, in accordance with an embodiment. Example 200 in FIG. 2 shows two types of updates generated by update source(s) 144: essential impactful update(s) 202 and non-essential impactful update(s) 204 generated by update sources 144A-N. In various examples, there may be one or more types of updates. In various examples, updater 112 may manage one or more (e.g., some or all) types of updates.

Update sources 144A-N may include, for example, utility applications executed by one or more servers (e.g., servers 122A-N, 124A-N, 126A-N, 128A-N) that monitor various parameters, such as temperature, software changes, firmware changes, hardware changes, hardware faults, etc.

As shown by example 200 in FIG. 2, non-essential impactful update(s) 204 may be managed and essential impactful update(s) 202 may be unmanaged. As shown by the dashed arrows, in some examples, the logic to distinguish between or route different types of updates depending on whether they are managed or unmanaged may be located in update source(s) 144A-N. As shown by the dashed arrows, in some examples, the logic to distinguish between types of updates that are managed or unmanaged may be located in updater 112.

Updater 112 may receive (e.g., intercept) non-essential impactful update(s) 204 from update sources 144A-N to manage them. Essential impactful update(s) 202 may be delivered to allocator instances 110 as they are generated by update sources 144A-N, for example, to prevent allocator instances 110A-110N from allocating computing devices that may be unfit for allocation by allocator instances 110.

In some examples, updater 112 may dynamically manage non-essential impactful updates relative to (e.g., unmanaged) essential impactful updates, indicating updater 112 may at least be aware of essential impactful update(s) 202, or their processing by allocator instances 110 to determine how to manage non-essential impactful update(s) 204.

Figure 3:
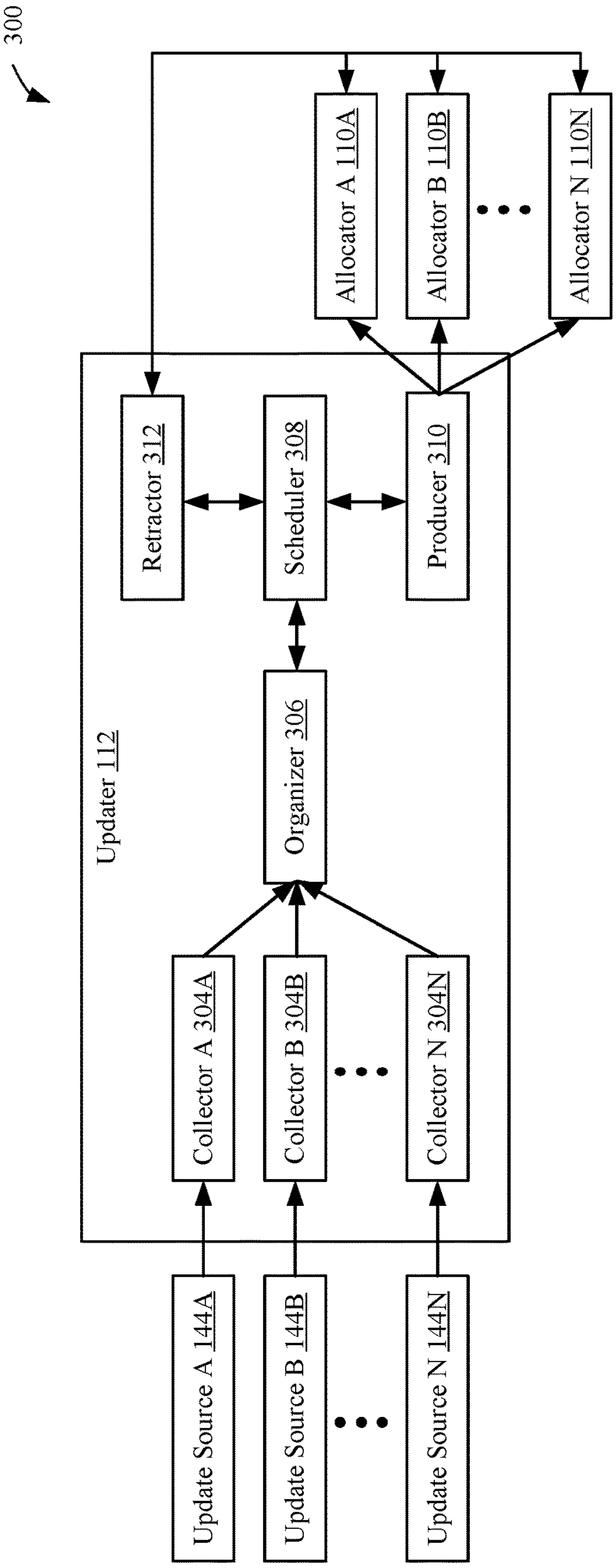
FIG. 3 illustrates an example configuration of an update manager to manage updates across partitions in a distributed cloud allocation system, in accordance with an embodiment.

FIG. 3 illustrates an example configuration of an update manager to manage updates across partitions in a distributed cloud allocation system, in accordance with an embodiment. As shown by example 300, updater 112 receives updates from update sources 144A-N and manages the updates for allocator instances 110A-N. Updater 112 may receive, plan or organize, schedule, deliver, and/or retract one or more types of updates to VM allocator instances 110 to control (e.g., limit) inventory disruptions and request fulfillment due to cache invalidations for updates. As shown by example 300, update may comprise one or more collectors 304A-N, organizer 306, scheduler 308, producer 310, and retractor 312.

Collectors 304A-N (e.g., listeners) may be configured to receive one or more types of computing inventory updates from one or more update sources 144A-N. Types of updates may include state changes to servers in various partitions in the computing inventory (servers 122A-N, 124A-N, 126A-N, 128A-N), such as changes to basic input output system (BIOS), software, operating system (OS), security, temperature, etc. As shown by example in FIG. 2, in some embodiments, one or more collectors 304A-N may receive updates comprising a first type of update (e.g., managed updates, such as non-essential impactful updates), but not a second type of update (e.g., unmanaged updates, such as essential impactful updates that are delivered (e.g., directly) to allocator instances 110A-N). Collectors 304A-N may provide updates to organizer 306.

Organizer 306 (e.g., planner) may be configured to organize updates received from collectors 304A-N into an update plan for allocators 110A-N. Organizer 306 may provide the update plan to scheduler 308. Organizer 306 may be configured to edit (e.g., dynamically adapt) the update plan based on additional updates received and provided by collectors 304A-N. Organizer 306 may revise an update plan based on feedback from scheduler 308. For example, organizer 306 may revise the plan based on failed updates reported via allocator instance(s) 110A-N, retractor 312, and scheduler 308. Furthermore, feedback provided by an allocator instance may be used to update and/or accelerate an update plan, including performing an update rollback in response to an update failure.

Organizer 306 may be configurable. Organizer 306 may be configured to plan delivery (e.g., timing) of updates based on one or more schemes, such as round-robin, random, first-in, first-out, etc., e.g., on a per partition basis. Organizer 306 may be configured to apply a time interval for updates based on partitions. For example, organizer 306 may be configured to apply a time interval for updates to clusters that is larger than a time interval for updates to racks. Organizer 306 may dynamically adapt an update plan to prevailing service conditions. For example, organizer 306 may pause update plans if an essential impactful update is in progress and/or if request demand is above a threshold. Organizer 306 may be configured to pause (e.g., delay) updates in the update plan based on an availability of computing devices (e.g., servers 122A-N, 124A-N, 126A-N, 128A-N) for allocation by allocator instances 110A-N to fulfill requests.

Organizer 306 may be configured to aggregate (e.g., group) or separate (e.g., ungroup) updates. Organizer 306 may be configured to aggregate (e.g., group) or separate (e.g., ungroup) updates based on partition scope. Organizer 306 may be configured to aggregate (e.g., group) updates as a batch of updates in the update plan based on the computing devices (e.g., servers 122A-N, 124A-N, 126A-N, 128A-N in various partitions) affected by the updates. Organizer 306 may be configured to plan batched updates to allocator instances 110 at the same or different times. Organizer 306 may be configured to batch updates to one or more partitions in a single update.

Organizer 306 may be configured to stagger updates in a variety of dimensions (e.g., by partition, time, or upgrade domain) for example, to maintain a sufficient number of allocator instances 110 to provide allocation services. Organizer 306 may be configured to stagger updates in the update plan among partitions (e.g., groups or portions) of the computing devices, for example, based on a scope or magnitude of impact on the computing devices, such as a number of computing devices, racks, clusters, data centers, etc. impacted by the update(s). Organizer 306 may be configured to stagger updates in the update plan based on allocation domain, e.g., among a plurality of allocation domains, which may or may not overlap among allocator instances 110A-N. Allocator instances may have the same or different allocation domains. Organizer 306 may be configured to stagger updates in the update plan among a plurality of logical instances of allocator 110 so that a sufficient number (which may be predetermined per zone, for example) of the plurality of logical allocator instances 110A-N remain available to fulfill requests.

Scheduler 308 may be configured to schedule delivery of the updates according to the update plan. Scheduler 308 may receive an update plan from organizer 306. Scheduler 308 may receive revisions to the update plan from organizer 306, e.g., as organizer 306 processes incoming updates. Scheduler may generate an update schedule for producer 310 to send/provide updates to allocator instances 110A-N. Scheduler may revise an update schedule for producer 310 to send/provide updates to allocator instances 110A-N, for example, based on revisions to the update plan by organizer 306. Scheduler 308 may update the schedule based on confirmations received from producer 310 that updates were successfully sent to and/or received by allocator instances 110A-N. Scheduler 308 may receive messages from retractor 312, for example, when retractor 312 indicates to allocator instances 110A-N to undo one or more updates. Scheduler 308 may, in turn, notify organizer 306, e.g., to revise the update plan to reintroduce the failed update in a revised update plan.

Producer 310 may be configured to deliver updates to allocator instances 110 according to the update schedule provided by scheduler 308. Producer may receive an update schedule and revisions thereto from scheduler 308. Producer 310 may indicate to scheduler 308 when updates on the update schedule are successfully sent to and/or received by allocator instances 110A-N.

Allocator instances 110A-N may process updates sent by producer 310, e.g., in addition to processing updates that may be sent directly by update sources 144A-N. Allocator instances 110A-N may be configured to allocate computing devices for VMs based on VM requests and a state of the computing inventory 142, which allocator instances 110A-N may be maintain in cache 140. Allocator instances 110A-N may replace portions of inventory state 142 in cache 140 as they process updates, impacting allocation. Allocator instances 110A-N may acknowledge receipt of each update, e.g., with an ACK message. Allocator instances 110A-N may report problems with updates to retractor 312. In some examples, allocator instances 110A-N may report problems with updates to producer 310 or another component in updater 112. Allocator instances 110A-N may receive an indication from retractor 312 or another component to undo (e.g., roll back) problematic updates.

Retractor 312 may be configured to roll back one or more updates delivered to allocator instances 110A-N, for example, if one or more allocator instances 110A-N report problems with the one or more updates. Retractor 312 may respond to allocator instances 110A-N to indicate whether to undo updates. Retractor 312 may report to scheduler 308 if/when retractor 312 notifies allocator instances 110A-N to undo one or more updates.

Figure 4:
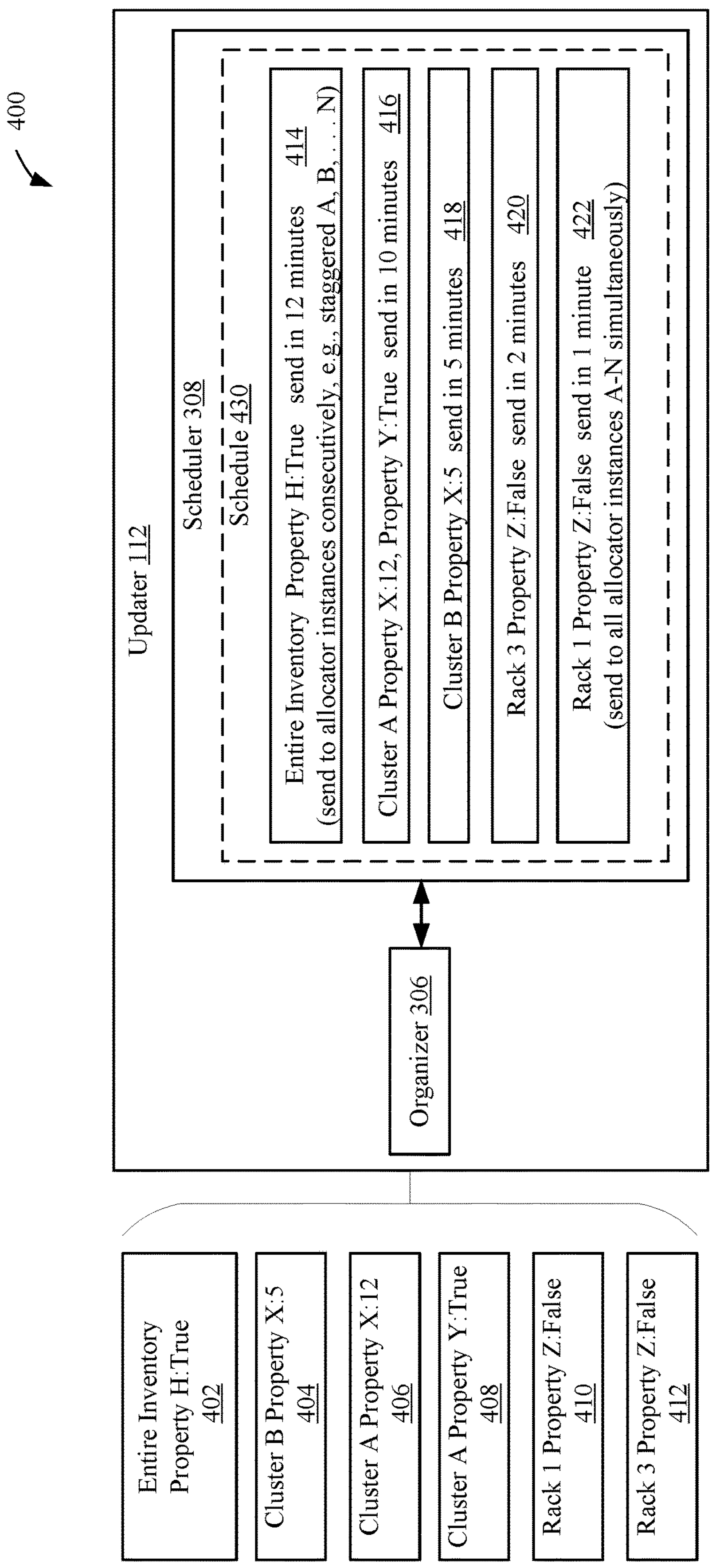
FIG. 4 illustrates an example of an update schedule that manages updates across partitions in a distributed cloud allocation system, in accordance with an embodiment.

FIG. 4 illustrates an example of an update schedule that manages updates across partitions in a distributed cloud allocation system, in accordance with an embodiment. As shown by example 400, scheduler 308 generates update schedule 430 based on an update plan generated by organizer 306 for updates 402-412 received from collectors 304A-N. Updates 402-412 may be received by collectors 304A-N and provided to organizer 306 at different times. The example updates include update 402, which sets property H to a value of True, applies to the entire inventory of computing devices. Update 404, which sets property X to a value of 5 applies to cluster B. Update 406, which sets property X to a value of 12, applies to cluster A. Update 408, which sets property Y to a value of True applies to cluster A. Update 410, which sets property Z to a value of False, applies to Rack 1. Update 412, which sets property Z to a value of False, applies to Rack 3. Note that although the example of FIG. 4 with reference to updating property values, the updates disclosed herein are not limited to property values, but instead may be any suitable type of update. For instance, in an embodiment, an update may include a machine learning (ML) model configured to perform inference for a specific signal.

Organizer 306 may generate an update plan and revise the update plan as updates 402-412 are received from collectors 304A-N. Scheduler 308 may generate schedule 430 based on the plan. Schedule 430 may represent an update queue. As shown in schedule 430, organizer 306 organized and scheduler 308 scheduled six updates 402-412 into five updates in the following order: update 410 (scheduled update 422), update 412 (scheduled update 420), update 404 (scheduled update 418), update 406 and 408 (aggregated scheduled update 416), and update 402 (scheduled update 414).

Organizer 306 planned update 410 (scheduled update 422) to be sent to all allocator instances 110A-N simultaneously. Scheduler 308 scheduled update 410 (scheduled update 422) to be sent by producer 310 to allocator instances 110A-N in 1 minute.

Scheduler 308 scheduled update 412 (scheduled update 420) to be sent by producer 310 to allocator instances 110A-N in in 2 minutes.

Scheduler 308 scheduled update 404 (scheduled update 418) to be sent by producer 310 to allocator instances 110A-N in in 5 minutes.

Organizer 306 aggregated updates 406 and 408 into one update (aggregated scheduled update 416). Scheduler 308 scheduled updates 406 and 408 (aggregated scheduled update 416) to be sent by producer 310 to allocator instances 110A-N in in 10 minutes.

Organizer 306 planned to stagger update 402 (scheduled update 414), e.g., to be sent to allocator instances 110A-N consecutively. Scheduler 308 scheduled update 402 (scheduled update 414) to be sent by producer 310 to allocator instances 110A-N consecutively starting in 12 minutes, sending to each subsequent allocator instance 110B-N after successfully updating each successive allocator instance 110A-110N-1.

As shown in FIG. 4, updater 112 (e.g., organizer 306) may aggregate the updates based on their partition scope. When there is a new update for a partition that already has a pending update in schedule 430, updater 112 (e.g., organizer 306) can choose to batch them into one update. As shown in FIG. 4, there are multiple updates for different partitions. Updates for Cluster A are aggregated into a single update. The size of the update for a given partition may not change the time needed for allocator instances 110A-N to reevaluate cache 140. Thus, one batched update instead of two separate updates may halve the time spent in the allocator instances to consume the update. Aggregating the updates may minimize the impact on the allocator service.

As shown in FIG. 4, delivery and timing may be configurable (i.e., round-robin, random, first-in, first-out, etc.), e.g., on a per partition basis. For example, as shown in FIG. 4, an update in a single rack is less impactful compared to an update in an entire cluster. Accordingly, a time interval between cluster updates (e.g., 5 minutes) may be longer than a time interval for rack updates (e.g., 1 minute). Updates to multiple partitions may (e.g., also) be batched (e.g., in addition to batching multiple updates to the same partition). Updater (e.g., organizer 306) may plan to send an update for multiple partitions, for example, if the total amount of invalidations caused by the batch is small enough (e.g., insufficiently disruptive to separate). Selected allocator instances 100A-N may receive a batched update at the same time.

Updater 112 (e.g., organizer 306) may dynamically adapt to the current service conditions. For example, if there is an essential impactful update in progress at one or more allocator instances 110A-N, or if the request demand from entities is very high, Updater 112 (e.g., organizer 306) may recognize dynamic states and/or pause updates, for example, until the allocator instance(s) 110A-N reach a state of relative quiescence.

As shown in FIG. 4, e.g., with respect to update 402 (scheduled update 414), updater 112 (e.g., organizer 306) may stagger the updates in a different dimension (e.g., time), for example, if a partition associated with an update is the entire inventory or a global service configuration, which may prevent all allocator instances 110A-N from consuming the update at the same time. Updater 112 (e.g., organizer 306) may use a different mechanism where each allocator instance consumes an impactful update during an update domain (UD)-by-UD. A UD-by-UD managed update may be utilized as a way to safely restart all allocator instances 110A-N while maintaining a quorum of the allocation service. This allows the entire inventory to be updated while having the option to revert the update if it causes unexpected problems. For example, an update for an availability zone may invalidate the entire inventory. In a UD-by-UD managed update, other allocator instances remain available to accept allocation requests while an allocator instance is being updated.

Invalidations from non-essential impactful updates may be controlled regardless of the partition type or size. Update sources 144A-N of the impactful updates may produce the updates in real time without concern about the impact on allocator instances 110A-N. Updater 112 components (e.g., organizer 306, scheduler 308, producer 310, and collector 304A-N) may be tuned, e.g., independently, for performance with a variety of scenarios involving essential impactful updates and non-essential impactful updates.

FIG. 5A shows a flowchart of a process for managing updates across partitions in a distributed cloud allocation system, in accordance with an embodiment. Example computing systems shown in examples 100, 200, 300, and 400, as shown by examples in FIGS. 1-4, may operate according to example flowchart 500, e.g., at least in some embodiments. For example, example flowchart 500 may be implemented by management service 108, such as updater 112 and allocator 110, or by subcomponents thereof. Various embodiments may implement one or more steps shown in FIG. 5A with additional and/or alternative steps. Further structural and operational embodiments will be apparent to persons skilled in the relevant art(s) based on the following description of FIG. 5A.

Flowchart 500 includes step 502. In step 502, updates associated with computing devices in a computing inventory may be received from an update source. For example, as shown in FIG. 3, collectors 304A-N may receive updates 144A-N.

In step 504, the updates may be organized into an update plan. For example, as shown in FIGS. 3 and 4, organizer 306 may organize updates 144A-N or updates 402-412 received from collectors 304A-N. Organizer 306 may organize updates 144A-N or updates 402-412 in a staggered manner in the update plan in any suitable manner (e.g., reordering updates, delaying updates, merging updates, separating updates, etc.).

In step 506, the updates may be scheduled for delivery according to the update plan. For example, as shown in FIGS. 3 and 4, scheduler 308 may schedule updates 402-412 as scheduled updates 414-422 in schedule 430 for delivery by producer 310.

In step 508, the updates may be delivered according to the schedule to a virtual machine (VM) allocator configured to allocate the computing devices for VMs based on VM requests and a state of the computing inventory. For example, as shown in FIGS. 3 and 4, producer 310 may deliver scheduled updates 414-422 to allocator instances 110A-N in accordance with schedule 430.

As described above, organizer 306 may stagger updates 402-412 so that scheduler 308 may schedule updates 402-412 as scheduled updates 414-422 in schedule 430 for delivery in a staggered manner by producer 310. For instance, FIGS. 5B-D shows flowcharts 510, 520, and 530, respectively, of processes for staggering updates in a distributed cloud allocation system, in accordance with example embodiments. Flowcharts 510, 520, and 530 are described as follows with respect to FIGS. 1-4.

Flowchart 510 includes step 512. In step 512, updates in the update plan are staggered among partitions of the computing devices. For instance, as described above, organizer 306 may be configured to stagger updates in a variety of dimensions (e.g., by partition, time, or upgrade domain) for example, to maintain a sufficient number of allocator instances 110 to provide allocation services. According to step 512, organizer 306 may be configured to stagger updates in the update plan among partitions (e.g., groups or portions) of the computing devices, for example, based on a scope or magnitude of impact on the computing devices, such as a number of computing devices, racks, clusters, data centers, etc. impacted by the update(s). Scheduler 308 is configured to schedule delivery of the updates of the update plan in an update schedule for producer 310 such that updates are staggered by allocator instances 110A-N to the various partitions.

Flowchart 520 includes step 522. In step 522, updates in the update plan are staggered among a plurality of logical instances of the VM allocator so that at least one of the plurality of logical instances of the VM allocator remains available to fulfill VM requests. For instance, as described above, organizer 306 may be configured to stagger updates in the update plan among a plurality of logical instances of allocator 110 so that at least one (e.g., a minimum required number) of the plurality of logical allocator instances 110A-N remain available to fulfill VM requests. Scheduler 308 is configured to schedule delivery of the updates of the update plan in an update schedule for producer 310 such that updates are staggered by allocator instances 110A-N so that at least one of allocator instances 110A-N remains available to fulfill VM requests.

Flowchart 530 includes step 532. In step 532, updates are staggered in the update plan among a plurality of allocation domains. For instance, as described above, organizer 306 may be configured to stagger updates in the update plan based on allocation domain, e.g., among a plurality of allocation domains, which may or may not overlap among allocator instances 110A-N. Scheduler 308 is configured to schedule delivery of the updates of the update plan in an update schedule for producer 310 such that updates are staggered by allocator instances 110A-N among the allocation domains.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of computing devices 102A-N, servers 122A-N, 124A-N, 126A-N, 128A-N, and/or another computing device of server infrastructure 104 as described with respect to FIG. 1 and other figures, each of which may include one or more of the components of computing device 602. In some embodiments, computing device 602 is communicatively coupled with devices (not shown in FIG. 6) external to computing environment 600 via network 1004. Network 604 is an example of network 106 of FIG. 1. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 1002 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing one or more of management service 108, allocator 110 (e.g., allocator instances 110A-N), updater 112, update sources 144A-N, cluster 116A-N, VM 130A-N, VM clusters 132A-N, ML workspaces 134A-N, scale sets 136A-N, collectors 304A-N, organizer 306, scheduler 308, producer 310, retractor 312, along with any components and/or subcomponents thereof, as well as the flowcharts/flow diagrams (e.g., flowcharts 500, 510, 520, 530) described herein, including portions thereof, and/or further examples described herein.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi 662 modem (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform such as Amazon Web Services® of Amazon Web Services, Inc., or Google Cloud Platform™ of Google LLC, although these are only examples and are not intended to be limiting.

In an embodiment, computing device 602 may access application programs 676 for execution in any manner, such as by a client application and/or a browser at computing device 602. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

IV. Additional Example Embodiments

Systems, methods, and instrumentalities are described herein related to management of updates across partitions in a distributed cloud allocation system. Some updates (e.g., non-essential impactful updates) may be managed (e.g., staggered), e.g., rather than immediately processed, to maintain adequate service to allocate computing inventory to meet requests for virtual machine (VM) creation. An update service may receive, plan or organize, schedule, and deliver one or more types of updates to VM allocator instances to control (e.g., limit) inventory disruptions and request fulfillment due to cache invalidations for updates. Updates may be aggregated based on partition scope. Updates to one or more partitions may be batched in a single update. Delivery and timing of updates may be configurable (e.g., round-robin, random, first-in, first-out, etc.) on a per partition basis. For example, a time interval for updates to clusters may be larger than a time interval for updates to racks. Allocator instances may receive batched updates at the same or different times. An update service may dynamically adapt to prevailing service conditions. For example, an update service may pause update plans if an essential impactful update is in progress and/or request demand is above a threshold. Updates may be staggered in a variety of dimensions, e.g., by partition, time, or upgrade domain, to maintain a sufficient number of allocator instances to provide service.

In examples, an update service collector (e.g., listener) may be configured to receive from one or more update sources one or more types of computing inventory updates (e.g., state changes, such as updates to basic input output system (BIOS), software, operating system (OS), security, temperature) associated with computing devices in a computing inventory. An update service organizer (e.g., planner) may be configured to organize the updates in an update plan, such as in a staggered manner. An update service scheduler may be configured to schedule delivery of the updates according to the update plan. An update service producer may be configured to deliver the updates according to the schedule to a virtual machine (VM) allocator configured to allocate the computing devices for VMs based on VM requests and a state of the computing inventory, which may be maintained in cache. An update service retractor may be configured to roll back the updates delivered to the VM allocator.

An update service organizer may be configured to edit (e.g., dynamically adapt) the update plan based on additional updates received by an update service collector. An update service organizer may be configured to aggregate (e.g., group) updates as a batch of updates in the update plan based on the computing devices affected by the updates. An update service organizer may be configured to stagger updates in the update plan among partitions (e.g., groups or portions) of the computing devices, for example, based on a scope or magnitude of impact on the computing devices, such as a number of computing devices, racks, clusters, data centers, etc. An update service organizer may be configured to stagger updates in the update plan among a plurality of logical instances of the VM allocator so that at least one of the plurality of logical instances of the VM allocator remains available to fulfill VM requests. An update service organizer may be configured to stagger updates in the update plan among a plurality of allocation domains. An update service organizer may be configured to pause (e.g., delay) updates in the update plan based on an availability of the computing devices for allocation by the VM allocator to fulfill VM requests. An update service collector may receive updates comprising a first type of update (e.g., non-essential impactful updates), but not a second type of update (e.g., essential impactful updates) that are delivered (e.g., directly) to the VM allocator.

Managed updates may improve request handling latency, peak request handling throughput, request acceptance success rate, server packing density, VM availability, interruption rates, QoS, etc.

A system is described herein. The system comprises a processor circuit and a memory. The memory stores program code that is executable by the processor circuit to perform a method of managing updates for a VM allocation system. The system comprises a collector (e.g., listener) configured to receive updates associated with computing devices in a computing inventory (e.g., state changes, such as to software applications or operating system, firmware, hardware (fault), security, temperature) from an update source. The system may comprise an organizer (e.g., planner) configured to organize the updates in an update plan, such as in a staggered manner. The system may comprise a scheduler configured to schedule delivery of the updates according to the update plan. The system may comprise a producer configured to deliver the updates according to the schedule to a virtual machine (VM) allocator configured to allocate the computing devices for VMs based on VM requests and a state of the computing inventory (e.g., maintained in cache).

In examples, the program code may comprise a retractor configured to roll back the updates delivered to the VM allocator.

In examples, the organizer may be configured to edit (e.g., dynamically adapt) the update plan based on additional updates received by the collector.

In examples, the organizer may be configured to aggregate (e.g., group) updates as a batch of updates in the update plan based on the computing devices affected by the updates.

In examples, the organizer may be configured to stagger updates in the update plan among partitions (e.g., groups or portions) of the computing devices (e.g., based on a scope or magnitude of impact on the computing devices-number of computing devices, racks, clusters, data centers).

In examples, the program code may comprise a plurality of logical instances of the VM allocator. The organizer may be configured to stagger updates in the update plan among the plurality of logical instances of the VM allocator so that at least one of the plurality of logical instances of the VM allocator remains available to fulfill VM requests.

In examples, the program code may comprise a plurality of logical instances of the VM allocator with a plurality of allocation domains. The organizer may be configured to stagger updates in the update plan among the plurality of allocation domains.

In examples, the organizer may be configured to pause (e.g., delay) updates in the update plan based on an availability of the computing devices for allocation by the VM allocator to fulfill VM requests.

In examples, the collector may receive updates comprising a first type of updates (e.g., non-essential updates), but not a second type of updates (e.g., essential updates) that are delivered to the VM allocator.

A method of managing updates for a virtual machine (VM) allocation system may be implemented in a computing device. The method may comprise, for example, receiving (e.g., by a collector from an update source) updates associated with computing devices in a computing inventory; organizing the updates in a staggered manner in an update plan; scheduling delivery of the updates according to the update plan; and delivering the updates according to the schedule to a VM allocator configured to allocate the computing devices for VMs based on VM requests and a state of the computing inventory.

In examples, the method may (e.g., further) comprise rolling back the updates delivered to the VM allocator.

In examples, the method may (e.g., further) comprise receiving additional updates; and dynamically adapting the update plan based on the additional updates.

In examples, organizing the updates in a staggered manner in an update plan may comprise aggregating updates as a batch of updates in the update plan based on the computing devices affected by the updates.

In examples, organizing the updates in a staggered manner in an update plan may comprise at least one of the following: staggering updates in the update plan among partitions of the computing devices; staggering updates in the update plan among a plurality of logical instances of the VM allocator so that at least one of the plurality of logical instances of the VM allocator remains available to fulfill VM requests; or staggering updates in the update plan among a plurality of allocation domains.

In examples, organizing the updates in a staggered manner in an update plan may comprise pausing updates in the update plan based on an availability of the computing devices for allocation by the VM allocator to fulfill VM requests.

In examples, the method may (e.g., further) comprise distinguishing between a first type of managed update and a second type of unmanaged update in the received updates.

A computer-readable storage medium is described herein. The computer-readable storage medium has computer program logic recorded thereon that when executed by a processor circuit causes the processor circuit to perform a method of managing updates for a virtual machine (VM) allocation system. The method may comprise, for example, receiving (e.g., by a collector from an update source) updates associated with computing devices in a computing inventory; organizing the updates in a staggered manner in an update plan; scheduling delivery of the updates according to the update plan; and delivering the updates according to the schedule to a VM allocator configured to allocate the computing devices for VMs based on VM requests and a state of the computing inventory.

In examples, the method may (e.g., further) comprise rolling back the updates delivered to the VM allocator.

In examples, the method may (e.g., further) comprise receiving additional updates; and dynamically adapting the update plan based on the additional updates.

In examples, organizing the updates in a staggered manner in an update plan comprises at least one of the following: aggregating updates as a batch of updates in the update plan based on the computing devices affected by the updates; staggering updates in the update plan among partitions of the computing devices; staggering updates in the update plan among a plurality of logical instances of the VM allocator so that at least one of the plurality of logical instances of the VM allocator remains available to fulfill VM requests; staggering updates in the update plan among a plurality of allocation domains; or pausing updates in the update plan based on an availability of the computing devices for allocation by the VM allocator to fulfill VM requests.

V. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, running examples have been described with respect to malicious activity detectors determining whether compute resource creation operations potentially correspond to malicious activity. However, it is also contemplated herein that malicious activity detectors may be used to determine whether other types of control plane operations potentially correspond to malicious activity.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating another user account's privileges (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system comprising:

a processor; and a memory device that stores program code structured to cause the processor to:

receive updates associated with a first partition of computing devices and a second partition of computing devices in a computing inventory from of a distributed cloud allocation system that allocates the first partition of computing devices and the second partition of computing devices in the computing inventory to fulfill virtual machine (VM) requests;

organize the updates in a first update plan;

adapt the updates based on a dynamically changing service condition indicating a current request demand for the computing devices is above a threshold, resulting in an organization of the updates associated with the first partition of computing devices and the second partition of computing devices in a staggered manner in a second update plan, the updates resulting in an invalidation of a state of the computing inventory in a first cache of a first allocator instance of a plurality of allocator instances, the state of the computing inventory in the first cache identifying at least the first partition computing devices that are available for allocating by the first allocator instance based on the VM requests;

schedule delivery of the updates according to the second update plan, the delivery limiting a service disruption based on the VM requests as a result of the invalidation based on a staggering of the updates among the plurality of allocator instances such that at least one additional allocator instance remains available to fulfill the VM requests; and deliver the updates according to the schedule to the first allocator instance that allocates the first partition of computing devices for VMs based on the VM requests and the state of the computing inventory in the first cache of the first allocator instance, the first cache rebuilt after the first allocator instance processes the updates, wherein a second allocator instance remains available for fulfilling the VM requests based on an inventory in a second cache of the second allocator instance during the processing the updates by the first allocator instance.

2. The system of claim 1, wherein the program code is further structured to cause the processor to:

roll back the updates delivered to the first allocator instance.

3. The system of claim 1, wherein the program code is further structured to cause the processor to:

edit the first update plan based on additional updates received from an update source.

4. The system of claim 1, wherein the program code is further structured to cause the processor to:

aggregate updates as a batch of updates in the second update plan based on the computing devices affected by the updates.

5. The system of claim 1, wherein the first allocator instance and the second allocator instance comprise a respective logical instance, and wherein the program code is further structured to cause the processor to:

stagger updates in the second update plan among the logical instances.

6. The system of claim 1, wherein the first allocator instance comprises a first logical instance with a first allocation domain and the second allocator instance comprises a second logical instance with a second allocation domain, and wherein the program code is further structured to cause the processor to:

stagger updates in the second update plan among the first and second allocation domains.

7. The system of claim 1, wherein the program code is further structured to cause the processor to:

pause updates in the second update plan based on an availability of the computing devices for allocation to fulfill VM requests.

8. The system of claim 1, wherein the program code is further configured to cause the processor to:

receive the updates comprising a first type of update, but not a second type of updates that are delivered to the first allocator instance.

9. A method of managing updates for a virtual machine (VM) allocation system comprising:

receiving updates associated with a first partition of computing devices and a second partition of computing devices in a computing inventory of a distributed cloud allocation system that allocates the first partition of computing devices and the second partition of computing devices in the computing inventory to fulfill virtual machine (VM) requests;

organizing the updates in a first update plan;

adapting the updates based on a dynamically changing service condition indicating a current request demand for the computing devices is above a threshold, resulting in an organization of the updates associated with the first partition of computing devices and the second partition of computing devices in a staggered manner in a second update plan, the updates resulting in an invalidation of a state of the computing inventory in a first cache of a first allocator instance of a plurality of allocator instances, the state of the computing inventory in the first cache identifying at least the first partition computing devices that are available for allocating by the first allocator instance based on the VM requests;

scheduling delivery of the updates according to the second update plan, the delivery limiting a service disruption based on the VM requests as a result of the invalidation based on a staggering of the updates among the plurality of allocator instances such that at least one additional allocator instance remains available to fulfill the VM requests; and delivering the updates according to the schedule to the first allocator instance that allocates the first partition of computing devices for VMs based on the VM requests and the state of the computing inventory in the first cache of the first allocator instance, the first cache rebuilt after the first allocator instance processes the updates, wherein a second allocator instance remains available for fulfilling the VM requests based on an inventory in a second cache of the second allocator instance during the processing the updates by the first allocator instance.

10. The method of claim 9, further comprising:

rolling back the updates delivered to the first allocator instance.

11. The method of claim 9, further comprising:

receiving additional updates; and dynamically adapting the first update plan based on the additional updates.

12. The method of claim 9, wherein organizing the updates in a staggered manner in an update plan comprises aggregating updates as a batch of updates in the second update plan based on the computing devices affected by the updates.

13. The method of claim 9, wherein the dynamically adapting the updates comprises at least one of the following:

staggering updates in the second update plan among a plurality of logical instances that include the first allocator instance and the second allocator instance so that at least one of the plurality of logical instances remains available to fulfill VM requests; or staggering updates in the second update plan among a plurality of allocation domains.

14. The method of claim 9, wherein the dynamically adapting the updates comprises pausing updates in the second update plan based on an availability of the computing devices for allocation to fulfill VM requests.

15. The method of claim 9, further comprising:

distinguishing between a first type of managed update and a second type of unmanaged update in the received updates.

16. A computer-readable storage medium having program instructions recorded thereon that, when executed by a processor, implements a method of managing updates for a virtual machine (VM) allocation system comprising:

receiving updates associated with a first partition of computing devices and a second partition of computing devices in a computing inventory of a distributed cloud allocation system that allocates the first partition of computing devices and the second partition of computing devices in the computing inventory to fulfill virtual machine (VM) requests;

organizing the updates in a first update plan;

adapting the updates based on a dynamically changing service condition indicating a current request demand for the computing devices is above a threshold, resulting in an organization of the updates associated with the first partition of computing devices and the second partition of computing devices in a staggered manner in a second update plan, the updates resulting in an invalidation of a state of the computing inventory in a first cache of a first allocator instance of a plurality of allocator instances, the state of the computing inventory in the first cache identifying at least the first partition computing devices that are available for allocating by the first allocator instance based on the VM requests;

scheduling delivery of the updates according to the second update plan, the delivery limiting a service disruption based on the VM requests as a result of the invalidation based on a staggering of the updates among the plurality of allocator instances such that at least one additional allocator instance remains available to fulfill the VM requests; and delivering the updates according to the schedule to the first allocator instance that allocates the first partition of computing devices for VMs based on the VM requests and the state of the computing inventory in the first cache of the first allocator instance, the first cache rebuilt after the first allocator instance processes the updates, wherein a second allocator instance remains available for fulfilling the VM requests based on an inventory in a second cache of the second allocator instance during the processing the updates by the first allocator instance.

17. The computer-readable storage medium of claim 16, wherein the method further comprises:

rolling back the updates delivered to the first allocator instance.

18. The computer-readable storage medium of claim 16, wherein the method further comprises:

receiving additional updates; and dynamically adapting the first update plan based on the additional updates.

19. The computer-readable storage medium of claim 16, wherein the dynamically adapting the updates comprises at least one of the following:

aggregating updates as a batch of updates in the second update plan based on the computing devices affected by the updates;

staggering updates in the second update plan among a plurality of logical instances that include the first allocator instance and the second allocator instance so that at least one of the plurality of logical instances remains available to fulfill VM requests;

staggering updates in the second update plan among a plurality of allocation domains; or pausing updates in the second update plan based on an availability of the computing devices for allocation to fulfill VM requests.

20. The computer-readable storage medium of claim 16, wherein the method further comprises:

distinguishing between a first type of managed update and a second type of unmanaged update in the received updates.

* * * * *